April 3, 1956 T. W. MILLNS 2,740,356

CARTRIDGE WITH COOLANT

Filed July 27, 1951

Inventor
T. W. Millns

United States Patent Office 2,740,356
Patented Apr. 3, 1956

2,740,356

CARTRIDGE WITH COOLANT

Terence William Millns, Westway, Shepherds Bush, London, England, assignor to Rotax Limited, London, England Application July 27, 1951, Serial No. 238,866

Claims priority, application Great Britain August 4, 1950

1 Claim. (Cl. 102—39)

This invention relates to cartridges for supplying gas to a gas-turbine which is used for starting an aircraft or other engine, or for other like purposes. When such a cartridge contains more than a given amount of propellent material, the temperature of the gases resulting from ignition of the charge may be such as will cause rapid deterioration of the turbine blades or otherwise injure parts through which the gases pass. Hitherto this condition has set an upper limit to the quantity of propellent material that could be provided in the cartridge. It is desired, however, to be able to use larger charges without detrimental results, and the object of the present invention is to enable this requirement to be met in a satisfactory manner.

The invention comprises a gas-supply cartridge having in combination a cartridge case containing propellent material and provided at one end with outlet means for the discharge of hot gases resulting from ignition of the propellent material, a hollow head extending from the said end of the cartridge case and forming a closed chamber which contains a liquid capable of being converted by the heat of the gases into steam which on admixture with the hot gases will serve to prevent the attainment of excessively high temperature, a plurality of tubes extending through the hollow head and forming the case outlet means, a thin cover piece closing the outer ends of the tubes and capable of being disrupted by the gases, and fusible means sealing at least one outlet opening in the outer end of the head and capable of being melted by heat derived from combustion of the propellent material to permit admixture of the chamber content with the hot gases.

Figure 1:
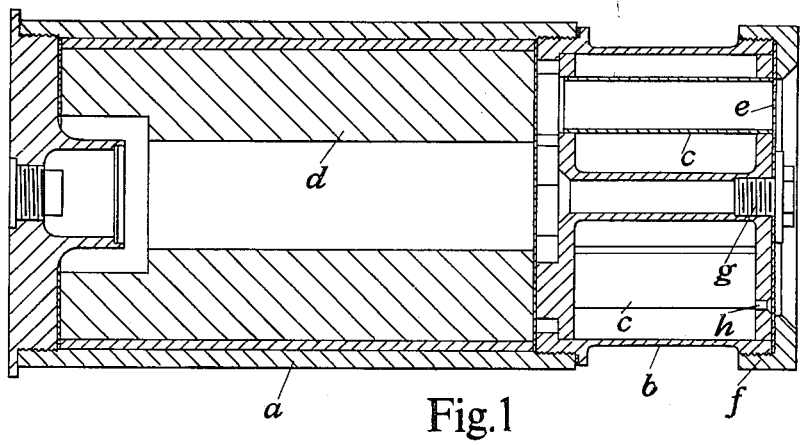

In the accompanying drawings:

Figure 1 is a longitudinal section, and

Figure 2:
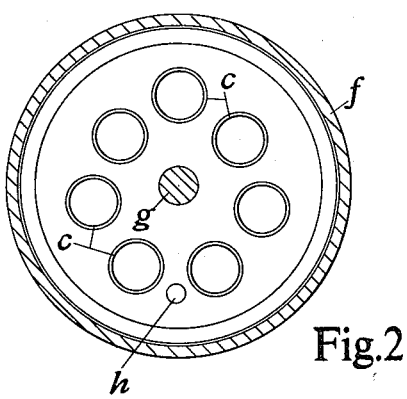

Figure 2 a cross section illustrating one embodiment of the invention.

Referring to the drawings, there is provided at the end of the cartridge case $a$ through which the hot gases are discharged, a hollow head $b$ adapted to contain an adequate quantity of water for the purpose in view. To minimise risk of freezing of the water under cold climatic conditions, it may have mixed with it any convenient substance for lowering the freezing point. In the said head are secured parallel with each other and with the axis of the case, a plurality of metal tubes $c$ along which the emergent gases can flow, and through which heat can readily pass from the gases to the surrounding water, when the propellent material $d$ is ignited.

The outer ends of the tubes are closed by a thin metal cover disc $e$ which is held in position by an annular cover piece $f$ and a central screw $g$ and which is blown off when the charge is ignited. Also a fusible plug $h$ or plugs is or are provided for closing the region containing the water, the plug or plugs being melted by the hot gases for the release of the water. Either prior to or after the release, the water is converted by the heat of the gases into steam, and the admixture of the steam with the gases prevents the attainment of such a temperature as might injure the turbine blades or other parts exposed to the gases.

Having thus described my invention what I claim as new and desire to secure by Letters Patent is:

A gas-supply cartridge comprising in combination a cartridge case containing propellent material and provided at one end with outlet means for the discharge of hot gases resulting from ignition of the propellent material, a hollow head extending from the said end of the cartridge case and forming a closed chamber which contains a liquid capable of being converted by the heat of the gases into steam which on admixture with the hot gases will serve to prevent the attainment of excessively high temperature, a plurality of tubes extending through the hollow head and forming the case outlet means, a thin cover piece closing the outer ends of the tubes and capable of being disrupted by the gases, and fusible means sealing at least one outlet opening in the outer end of the head and capable of being melted by heat derived from combustion of the propellent material to permit admixture of the chamber content with the hot gases.

References Cited in the file of this patent

UNITED STATES PATENTS

| | | |
|---|---|---|
| 671,708 | Noble | Apr. 9, 1901 |
| 1,187,779 | Patten | June 20, 1916 |
| 2,444,957 | Skinner | July 13, 1948 |
| 2,544,422 | Goddard | Mar. 6, 1951 |

FOREIGN PATENTS

| | | |
|---|---|---|
| 477,022 | France | June 24, 1915 |